United States Patent
Zhang et al.

(10) Patent No.: US 9,516,385 B2
(45) Date of Patent: Dec. 6, 2016

(54) TECHNIQUE FOR OBTAINING A MULTICAST ADDRESS THAT MATCHES AN IP VERSION SUPPORTED BY A TERMINAL

(71) Applicant: Huawei Technologies Co., Ltd., Shenzhen (CN)

(72) Inventors: Zhongjian Zhang, Shenzhen (CN); Min Zha, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 256 days.

(21) Appl. No.: 14/298,486

(22) Filed: Jun. 6, 2014

(65) Prior Publication Data

US 2014/0289770 A1   Sep. 25, 2014

Related U.S. Application Data

(63) Continuation of application No. PCT/CN2012/085994, filed on Dec. 6, 2012.

(30) Foreign Application Priority Data

Dec. 9, 2011 (CN) .......................... 2011 1 0409728

(51) Int. Cl.
*H04N 21/482* (2011.01)
*H04N 21/4385* (2011.01)
(Continued)

(52) U.S. Cl.
CPC ............ *H04N 21/482* (2013.01); *H04L 12/18* (2013.01); *H04L 65/103* (2013.01);
(Continued)

(58) Field of Classification Search
CPC .............. H04N 21/482; H04N 21/4385; H04N 21/64322; H04N 21/6405; H04L 65/103; H04L 65/4076; H04L 12/18; H04L 61/251
(Continued)

(56) References Cited

U.S. PATENT DOCUMENTS 7,263,560 B2 *   8/2007   Abdelaziz ........... H04L 61/3065
                                                    709/228
7,644,171 B2 *   1/2010   Sturniolo ............ H04W 80/045
                                                    709/230
(Continued)

FOREIGN PATENT DOCUMENTS

CN   101005390 A   7/2007
CN   101090327 A   12/2007
(Continued)

OTHER PUBLICATIONS

Tsou, et al., "Address Acquisition for Multicast Content When Source and Receiver Support Differing IP Versions," Internet Engineering Task Force, Jan. 3, 2013, 10 pages.
(Continued)

*Primary Examiner* — Hoang-Vu A Nguyen-Ba
(74) *Attorney, Agent, or Firm* — Slater Matsil, LLP

(57) ABSTRACT

A method for obtaining a multicast address. A first request message is sent to the EPG device to obtain program guide information. The program guide information is returned by the EPG device. A multicast address matching a current user terminal is obtained according to the program guide information. A multicast request message is sent according to the multicast address.

19 Claims, 8 Drawing Sheets

(51) Int. Cl.
*H04L 29/06* (2006.01)
*H04N 21/643* (2011.01)
*H04L 12/18* (2006.01)
*H04N 21/6405* (2011.01)
*H04L 29/12* (2006.01)

(52) U.S. Cl.
CPC ..... *H04L 65/4076* (2013.01); *H04N 21/4385* (2013.01); *H04N 21/6405* (2013.01); *H04N 21/64322* (2013.01); *H04L 61/251* (2013.01)

(58) Field of Classification Search
USPC ........... 725/39, 98, 100, 110, 118, 131, 139, 148, 725/151
See application file for complete search history.

(56) References Cited

U.S. PATENT DOCUMENTS

| | | | | |
|---|---|---|---|---|
| 8,190,706 | B2* | 5/2012 | Poder | H04L 12/2812 709/217 |
| 2002/0007414 | A1* | 1/2002 | Inoue | H04W 88/02 709/230 |
| 2006/0140213 | A1 | 6/2006 | Hwang et al. | |
| 2007/0171930 | A1 | 7/2007 | Kamata et al. | |
| 2008/0080519 | A1 | 4/2008 | Park et al. | |
| 2008/0216143 | A1 | 9/2008 | Ikeda et al. | |
| 2011/0107379 | A1* | 5/2011 | Lajoie | H04L 65/1016 725/87 |
| 2012/0278845 | A1 | 11/2012 | Ou | |

FOREIGN PATENT DOCUMENTS

| | | |
|---|---|---|
| CN | 101374069 A | 2/2009 |
| CN | 101442663 A | 5/2009 |
| CN | 102118653 A | 7/2011 |

OTHER PUBLICATIONS

Boucadair, M., et al., "Session Description Protocol (SDP) Alternate Connectivity (ALTC) Attribute," Network Working Group Internet-Draft, XP015078106, Sep. 16, 2011, 14 pages.

Jacquenet, C., et al., "IPv4-IPv6 Multicast: Problem Statement and Use Cases," BEHAVE Working Group Internet—Draft, XP015074847, Mar. 14, 2011, 21 pages.

Tsou, T., et al., "Use Cases for Multicast Transition From IPv4 to IPv6," Internet Engineering Task Force Internet—Draft, XP015077790, Aug. 25, 2011, 14 pages.

Tsou, T., et al., "Address Acquisition for Multicast Content When Source and Receiver Support Differing IP Versions," Internet Engineering Task Force Internet—Draft, XP015084027, Jul. 10, 2012, 10 pages.

* cited by examiner

TECHNIQUE FOR OBTAINING A MULTICAST ADDRESS THAT MATCHES AN IP VERSION SUPPORTED BY A TERMINAL

This application is a continuation of International Application No. PCT/CN2012/085994, filed on Dec. 6, 2012, which claims priority to Chinese Patent Application No. 201110409728.6, filed on Dec. 9, 2011, both of which are hereby incorporated by reference in their entireties.

TECHNICAL FIELD

The present application relates to the field of communications, and in particular, to a method, device and system for obtaining a multicast address.

BACKGROUND

An IPTV (Internet protocol television) is a brand-new technology which uses a broadband cable television network, integrates multiple technologies, including the Internet, multi-media, communication and the like, transmits multi-media data, such as television, a video, a text, and an image through an IP (Internet protocol) network, and provides family users with multiple interactive services including digital television. A user may enjoy an IPTV service through a computer, or in a manner of a network set top box+an ordinary television set.

In recent years, with an increase in the number of network users, IPv4 (Internet protocol version 4) addresses are gradually used up, and a service adopting an IPv4 network cannot keep growing, unless it is migrated to an IPv6 network. Because in the IPTV technology, data is transmitted through the IP network, during a process of migrating from IPv4 to IPv6, an IPTV service management system needs to adapt to a scenario in which networks and devices of IPv4 and the IPv6 coexist.

Currently, the IPTV service management system mainly adapts to the scenario in which the networks and the devices of IPv4 and the IPv6 coexist by using an ALG (application layer gateway). As shown in FIG. 1, a user terminal is a multicast receiver, such as an STB (set top box) or a computer. The ALG has an interworking capability of the IPv4 network and the IPv6 network and an application layer function. When receiving an IPv4-to-IPv6 (or IPv6-to-IPv4) multicast address mapping request sent by an EPG (electronic program guides) device, the ALG may generate a mapping table from an IPv4 (or IPv6) multicast address to an IPv6 (or IPv4) multicast address according to a mapping rule of the ALG and a corresponding table of the received IPv4 (or IPv6) multicast address and a channel, and send the mapping table to the EPG device, so that the EPG device generates the corresponding table of the IPv6 (or IPv4) multicast address and the channel according to the mapping table. Or the ALG intercepts a response packet that an EPG device responds to an electronic program guides request of the multicast receiver, generates an IPv6 (or IPv4) multicast address and a channel mapping table according to a mapping rule of the ALG, the intercepted corresponding table of the IPv4 (or IPv6) multicast address and the channel, and obtained version information of the multicast receiver, and then sends the corresponding table of the IPv6 (or IPv4) multicast address and the channel to the multicast receiver. It should be noted that, in the prior art, it is required that the EPG device is a dual-stack device, or there are two EPG (an IPv4 EPG and an IPv6 EPG) devices, so as to send IPv4 program guides to a user terminal only supporting IPv4, and send IPv6 program guides to a user terminal only supporting IPv6. Moreover, it is required that a network device has the application layer capability, and therefore the device is complex and has a high performance requirement.

During a process of implementing the present application, the inventor discovers that there are at least the following problems existing in the prior art. For example, the EPG device needs to interact with the ALG, causing complex processing of a correspondence between the channel and the multicast address by the EPG device, which is not beneficial for migrating the IPTV service management system from IPv4 to IPv6. In addition, a gateway device of the IPv4 network and a gateway device of the IPv6 network need to have the ALG capability and, therefore, the device is complex and there is a high performance requirement on the gateway device.

SUMMARY OF THE INVENTION

Embodiments of the present application provide a method, device and system for obtaining a multicast address, which, in a mixed receiving scenario in which IPv4 and IPv6 coexist, may allow a user terminal to obtain program guide information matching an IP version supported by the user terminal. During a whole process, interaction between an EPG device and an ALG is not required, lowering complexity of a device in an IPTV management system, and beneficial for migrating an IPTV service management system from IPv4 to IPv6.

To achieve the foregoing objective, the embodiments of the present application adopt the following technical solutions.

In an aspect, an embodiment of the present application provides a method for obtaining a multicast address. A first request message is sent to an EPG device to obtain program guide information. The program guide information is returned by the EPG device. One or more multicast address(es) matching a current user terminal are obtained according to the program guide information. A multicast request message is sent according to the multicast address(es). The multicast request message includes a multicast address selected by a user.

In another aspect, an embodiment of the present application further provides a method for obtaining a multicast address. Program guide information is obtained and saved the program guide information includes a correspondence between a multicast channel and a multicast address. When a first request message sent by a user terminal is received, the program guide information is sent to the user terminal, so as to enable the user terminal to obtain, according to the program guide information, a multicast address matching the user terminal. The first request message is used to instruct the EPG device to deliver the program guide information to the user terminal, and the matching refers to that an IP version supported by the multicast address is consistent with an IP version supported by the user terminal.

In still another aspect, an embodiment of the present application further provides a user terminal. A first sending unit is configured to send a first request message to an EPG device to obtain program guide information. A first processing unit is configured to receive the program guide information returned by the EPG device, to obtain, according to the program guide information, one or more multicast address(es) matching the user terminal, and to send a multicast request message according to the multicast address(es). The multicast request message includes a multicast address selected by a user.

In yet another aspect, an embodiment of the present application further provides a device, where the device is configured to send program guide information to a user terminal. In the device, a storing unit is configured to obtain and save the program guide information. The program guide information includes a correspondence between a multicast channel and a multicast address. A third processing unit is configured to, when a first request message sent by the user terminal is received, to send the program guide information to the user terminal, so as to enable the user terminal to obtain, according to the program guide information, a multicast address matching the user terminal. The first request message is used to instruct an EPG device to deliver the program guide information to the user terminal and the matching refers to that an IP version supported by the multicast address is consistent with an IP version supported by the user terminal.

In another aspect, an embodiment of the present application further provides a system for obtaining a multicast address, and the system includes a multicast source, the foregoing user terminal and device, where the multicast source is configured to provide the device with a correspondence between a multicast channel and a multicast address.

The method, device and system provided in the embodiments of the present application may, in a mixed receiving scenario in which an IPv4 device and an IPv6 device coexist, ensure the user terminal to obtain the multicast address matching the user terminal, and further send the multicast request message according to the multicast address. During a whole process, interaction between the EPG device and the ALG is not required, lowering complexity of the device in the IPTV management system, and beneficial for migrating the IPTV service management system from IPv4 to IPv6.

BRIEF DESCRIPTION OF THE DRAWINGS

To describe the technical solutions in the embodiments of the present application or in the prior art more clearly, the following briefly introduces accompanying drawings required for describing the embodiments or the prior art. Apparently, the accompanying drawings in the following description show merely some embodiments of the present application, and a person of ordinary skill in the art may still derive other drawings according to these accompanying drawings without creative efforts.

DETAILED DESCRIPTION OF ILLUSTRATIVE EMBODIMENTS

The following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

Figure 1:
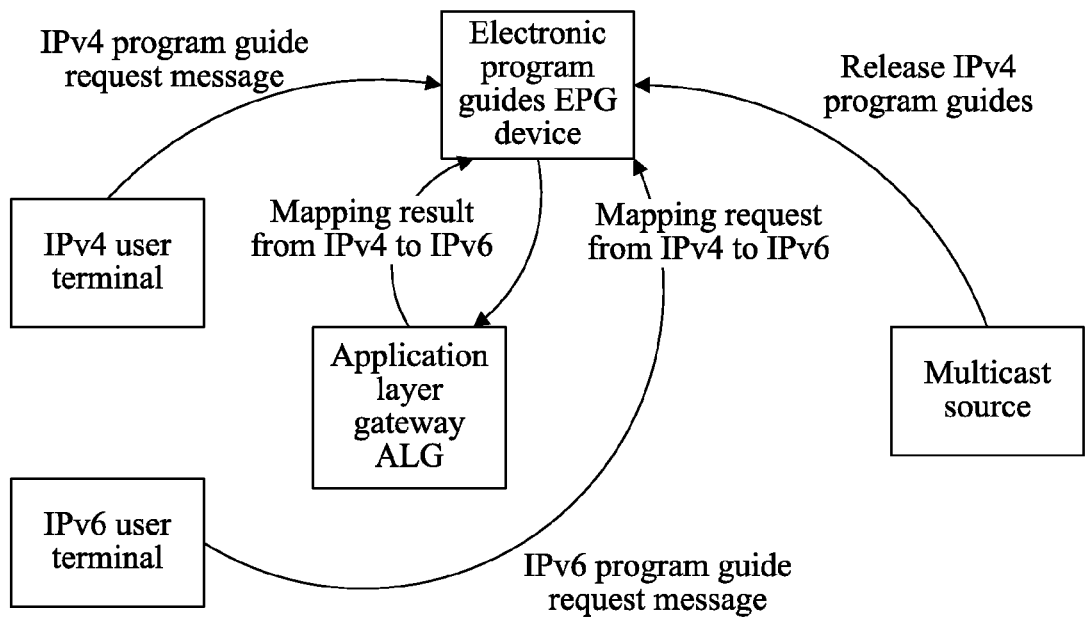
FIG. 1 is a technical solution for an IPTV system to solve compatibility between IPv4 and IPv6 in the prior art.
Figure 2:
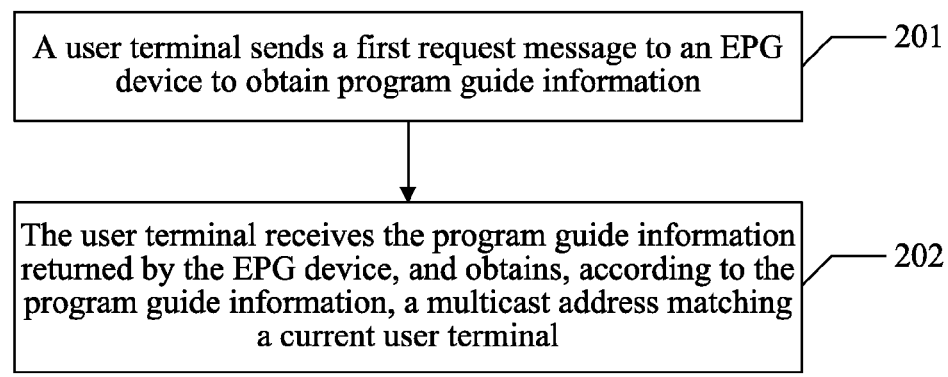
FIG. 2 is a schematic flow chart of a method according to another embodiment of the present application.

A first embodiment of the present application provides a method for obtaining a multicast address and is shown in FIG. 2. The method includes the following steps.

201: A user terminal sends a first request message to an EPG device to obtain program guide information.

Specifically, the user terminal may be an STB in an IPTV system or a computer in an IPTV system, and may also be another device having a similar function, which is not limited herein; the program guide information includes at least one of a correspondence between a multicast channel and an IPv4 multicast address, and a correspondence between the multicast channel and an IPv6 multicast address.

202: The user terminal receives the program guide information returned by the EPG device, obtains, according to the program guide information, a multicast address matching a current user terminal, and sends a multicast request message according to the multicast address, where the multicast request message includes a multicast address selected by a user.

Specifically, the user terminal may receive the program guide information and display the program guide information to the user for the user to select the multicast address according to a channel selected by the user and a protocol supported by the user terminal, and send the multicast request message to a multicast router, so as to obtain a multicast data stream. The multicast request message includes an IGMP (Internet group management protocol) request message, or an MLD (multicast listener discover) request message; when the user terminal merely supports an IPv4 protocol, the multicast request message sent to the multicast router is an IGMP request message; when the user terminal merely supports an IPv6 protocol, the multicast request message sent to the multicast router is an MLD request message; and when the user terminal supports both the IPv4 protocol and the IPv6 protocol, the multicast request message sent to the multicast router is an IGMP request message or an MLD request message.

The multicast router is configured to process a received multicast control packet, and obtain the multicast data stream from a multicast source for allocation.

It is obvious that the IGMP request message and the MLD request message are both used to obtain the multicast data stream from the multicast source, where the IGMP request message is applicable for a user equipment and network supporting IPv4, and the MLD request message is applicable for a user equipment and network supporting IPv6.

It should be noted that, the multicast address may be a multicast group address, and may also be a multicast group address and a multicast source address, which is not limited herein.

In the method provided in the embodiment of the present application, in a mixed receiving scenario in which an IPv4 device and an IPv6 device coexist, it is ensured that the user terminal obtain the multicast address matching the user terminal, and then obtain the multicast data stream. During a whole process, interaction between the EPG device and an ALG is not required, which lowers complexity of a device in an IPTV management system, and is beneficial for migrating an IPTV service management system from IPv4 to IPv6.

Figure 3:
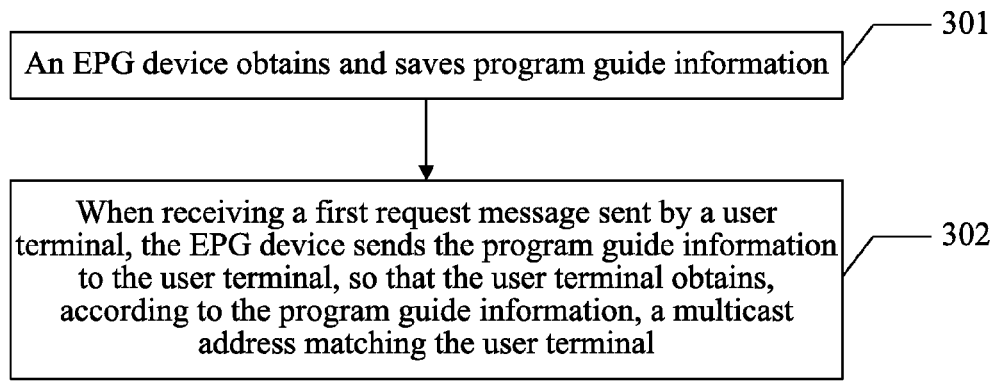
FIG. 3 is a schematic flow chart of a method according to another embodiment of the present application.

Another embodiment of the present application provides a method for obtaining a multicast address. The method may be implemented through a device (such as an EPG device) having a function of sending program guide information to a user terminal, and as shown in FIG. 3, taking the EPG device as the device that implements the implementation. The method includes the following steps.

301: The EPG device obtains and saves program guide information, where the program guide information includes a correspondence between a multicast channel and a multicast address.

Specifically, the EPG device is configured to obtain the program guide information from a multicast source or another management device (a device which can release the program guide information) and send the program guide information to the user terminal. It is obvious that, the EPG device in this embodiment may also be another device having the same function.

302: When receiving a first request message sent by the user terminal, the EPG device sends the program guide information to the user terminal, so as to enable the user terminal to obtain, according to the program guide information, a multicast address matching the user terminal, where the first request message is used to instruct the EPG device to deliver the program guide information to the user terminal, and the matching refers to that an IP version supported by the multicast address is consistent with an IP version supported by the user terminal.

In the method provided in the embodiment of the present application, when an IPv4 device and an IPv6 device coexist in an IPTV management system, the EPG device may deliver the multicast address matching the user terminal to the user terminal. During a whole process, interaction between the EPG device and an ALG is not required, which can lower complexity of a device in the IPTV management system, and is beneficial for migrating an IPTV service management system from IPv4 to IPv6.

Figure 4:
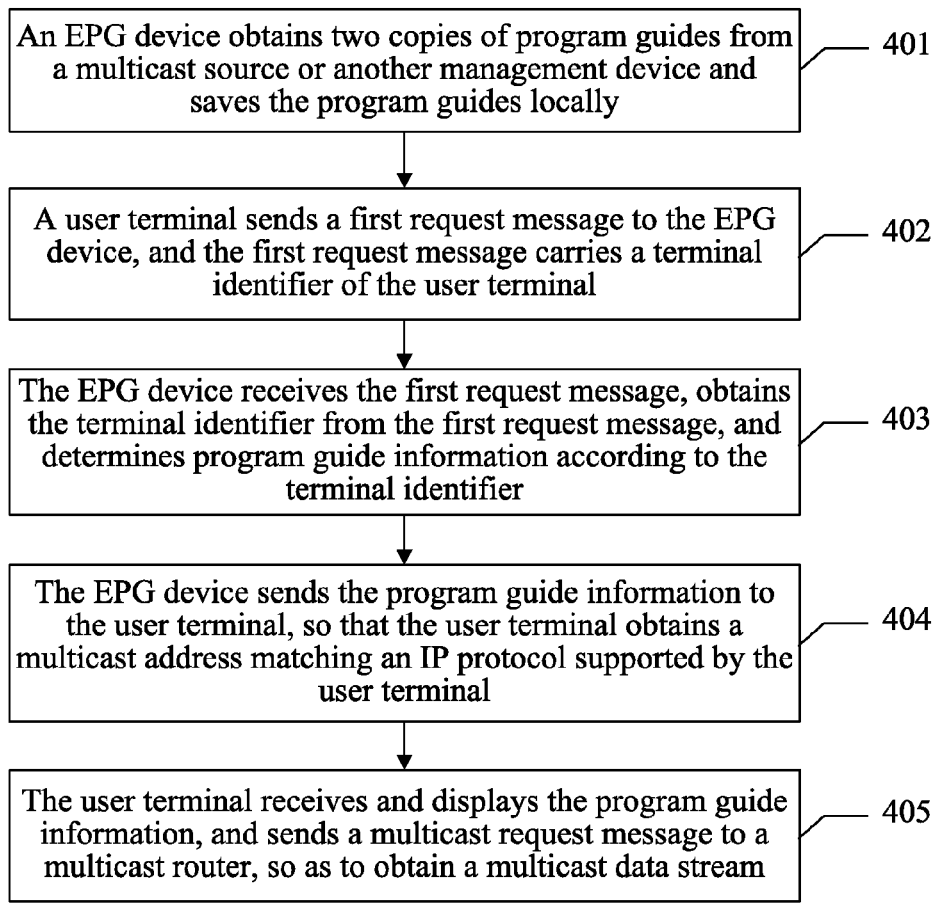
FIG. 4 is a schematic flow chart of a method according to another embodiment of the present application.

Another embodiment of the present application provides a method for obtaining a multicast address and is shown in FIG. 4. The method includes the following steps.

401: An EPG device obtains two copies of program guides from a multicast source or another management device (a device which can release program guide information) and saves the program guides locally. One copy of the program guides is used to represent a correspondence between a multicast channel and an IPv4 multicast address and the other copy of the program guides is used to represent a correspondence between the multicast channel and an IPv6 multicast address.

402: A user terminal sends a first request message to the EPG device. The first request message carries a terminal identifier of the user terminal. The first request message is used to instruct the EPG device to deliver program guide information including a multicast address matching a current user terminal to the user terminal. The terminal identifier is used to represent an IP version supported by the user terminal.

Specifically, the user terminal includes a user terminal only supporting an IPv4, or a user terminal only supporting an IPv6, or a dual-stack user terminal supporting both IPv4 and IPv6, which is not limited herein.

403: The EPG device receives the first request message, obtains the terminal identifier from the first request message, and determines program guide information according to the terminal identifier, where the program guide information includes a multicast address matching the user terminal.

The matching refers to that an IP version supported by the multicast address is consistent with the IP version supported by the user terminal.

404: The EPG device sends the program guide information to the user terminal, so as to enable the user terminal to obtain a multicast address matching an IP protocol supported by the user terminal.

405: The user terminal receives and displays the program guide information, and sends a multicast request message to a multicast router according to a user indication, so as to obtain a multicast data stream, where the multicast request message includes a multicast address selected by a user.

Specifically, the multicast router is configured to process a received multicast control packet, and obtain the multicast data stream from the multicast source for sending.

Specifically, when the user terminal only supports an IPv4 protocol, the multicast request message sent to the multicast source is an IGMP request message; when the user terminal only supports an IPv6 protocol, the multicast request message sent to the multicast source is an MLD request message. When the user terminal supports both the IPv4 protocol and the IPv6 protocol, the multicast request message sent to the multicast source is an IGMP request message or an MLD request message.

In the method for obtaining the multicast address provided in the embodiment of the present application, the two copies of the program guide information are saved in the EPG device, so as to enable the EPG device to send the program guide information to both the user terminal supporting IPv4 and the user terminal supporting IPv6, and the user terminal obtains the multicast address matching the user terminal. In the method provided in the embodiment of the present application, in a mixed receiving scenario in which an IPv4 device and an IPv6 device coexist, the program guide information may be sent to the user terminal to enable the user terminal to obtain the multicast address matching the user terminal. During a whole process, interaction between the EPG device and an ALG is not required, which lowers complexity of a device in an IPTV management system, and is beneficial for migrating an IPTV service management system from IPv4 to IPv6.

Figure 5:
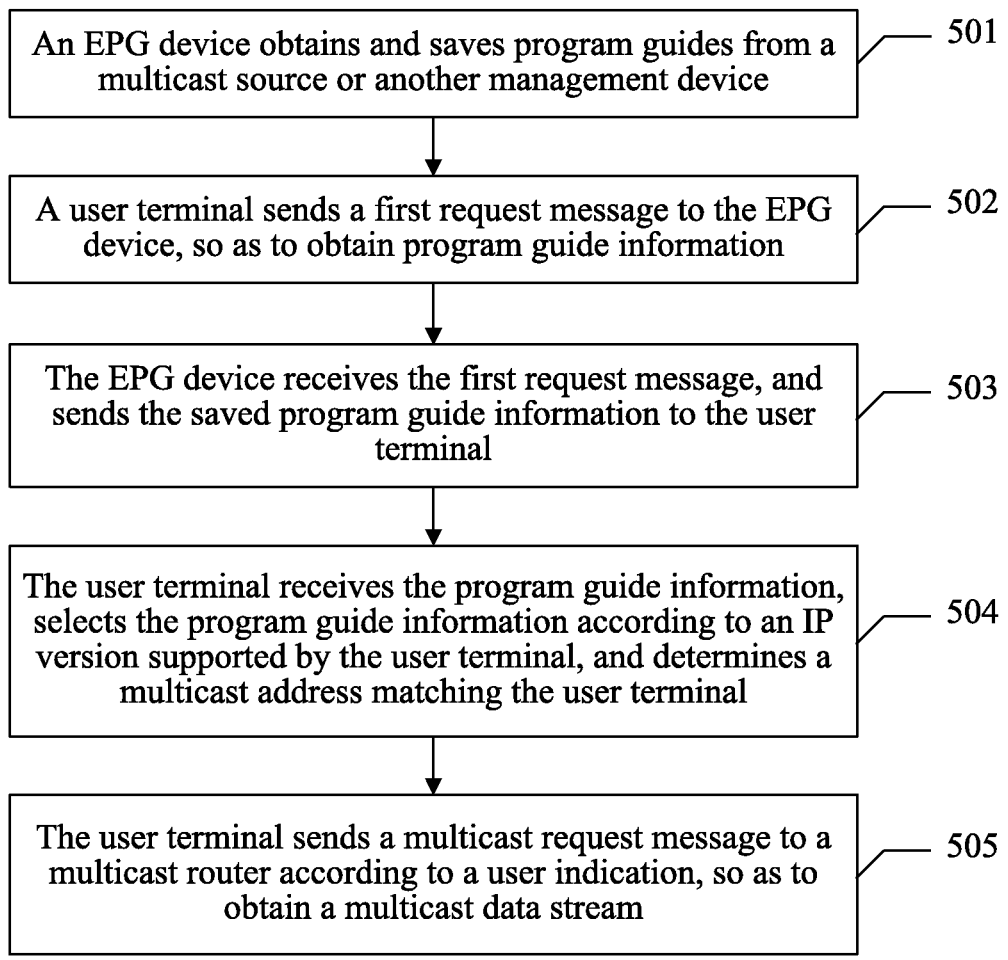
FIG. 5 is a schematic flow chart of a method according to another embodiment of the present application.

Another embodiment of the present application provides a method for obtaining a multicast address and is shown in FIG. 5. The method includes the following steps.

501: An EPG device obtains and saves program guides from a multicast source or another management device (a device which can release program guide information). The program guides include a correspondence between a multicast channel and an IPv4 multicast address, and a correspondence between the multicast channel and an IPv6 multicast address.

502: A user terminal sends a first request message to the EPG device, so as to obtain the program guide information. The first request message is used to instruct the EPG device to deliver the program guide information to the user terminal.

503: The EPG device receives the first request message, and sends the program guide information saved by the EPG device to the user terminal. The program guides include the correspondence between the multicast channel and the IPv4 multicast address and the correspondence between the multicast channel and the IPv6 multicast address.

504: The user terminal receives the program guide information, chooses program guide information according to an IP version supported by the user terminal, and determines a multicast address matching the user terminal.

Specifically, a user terminal of an IPv4 obtains the correspondence between the multicast channel and the IPv4 multicast address from the program guide information, and a user terminal of an IPv6 obtains the correspondence between the multicast channel and the IPv6 multicast address from the program guide information.

505: The user terminal sends a multicast request message to a multicast router according to a user indication, so as to obtain a multicast data stream, where the multicast request message includes a multicast address selected by a user.

Specifically, the user terminal supporting IPv4 may send an IGMP request message to the multicast router to obtain the multicast data stream. The user terminal supporting IPv6 may send an MLD request message to the multicast router to obtain the multicast data stream. The user terminal supporting both IPv4 and IPv6 may send an IGMP request message or an MLD request message to the multicast router to obtain the multicast data stream.

It should be noted that, when the user terminal supports both IPv4 and IPv6, the multicast request message may be further determined through detecting an IP version supported by a current network.

Specifically, when the network supports IPv4, the user terminal may send the IGMP request message to the multicast router to obtain the multicast data stream. When the network supports IPv6, the user terminal may send the MLD request message to the multicast router to obtain the multicast data stream. When the network supports both IPv4 and IPv6, the user terminal may send the IGMP request message or the MLD request message to the multicast router according to obtained version information of the multicast source to obtain the multicast data stream. The user terminal may obtain, from the EPG device, the version information supported by the multicast source. Specifically, when the multicast source is IPv4, the user terminal sends the IGMP request message to the multicast router. When the multicast source is the IPv6, the user terminal sends the MLD request message to the multicast router; when the multicast source supports both IPv4 and IPv6, the user terminal sends the IGMP request message or the MLD request message to the multicast router.

Specifically, the user terminal may adopt the following method to detect the IP version supported by the network. The user terminal obtains the IP version supported by the network according to WAN (wide area network) interface information of a home gateway, for example, in a DS-lite (a simple dual-stack network) scenario, a WAN interface is an IPv6 address, a WAN interface in a conventional IPv4 network is an IPv4 address. A manner for the user terminal to obtain the WAN interface information of the home gateway may be using an existing protocol, such as a UPnP (universal plug and play) protocol.

Alternatively, the user terminal receives an indication message sent by a DHCP (dynamic host configuration protocol) server, so as to determine the IP version supported by the network. For example, through an extended DHCP protocol, the DHCP server informs the user terminal of a preferred network, and an indication message for preferentially sending an IPv6 or IPv4 packet may be carried in an acknowledge ACK message that the DHCP server sends to the user terminal.

It should be noted that, when the user terminal cannot identify a topology of the network, the user terminal may simultaneously send the IGMP request message and the MLD request message to the network. The multicast router may select, according to a preset rule, a request message for processing. Alternatively, the multicast source processes both the received IGMP request message and the received MLD request message, and sends the multicast data stream corresponding to the IGMP/MLD request message to the user terminal, and the user terminal may selectively receive according to a time sequence of the received multicast data stream, for example, the user terminal may selectively receive an IPv6 multicast data stream or an IPv4 multicast data stream which arrives earlier.

In the method for obtaining the multicast address provided in the embodiment of the present application, the user terminal obtains, from the EPG device, the correspondence between the multicast channel and the IPv4 multicast address and the correspondence between the multicast channel and the IPv6 multicast address, from which the multicast address matching the user terminal is selected, so as to obtain the multicast data stream. In the method provided in the embodiment of the present application, the user terminal may obtain program guide information matching the IP version supported by the user terminal. During a whole process, interaction between the EPG device and an ALG is not required, which lowers complexity of a device in an IPTV system. Moreover, a type of the multicast request message may be further determined according to the topology of the network, which is beneficial for migrating an IPTV service management system from IPv4 to IPv6.

Figure 6:
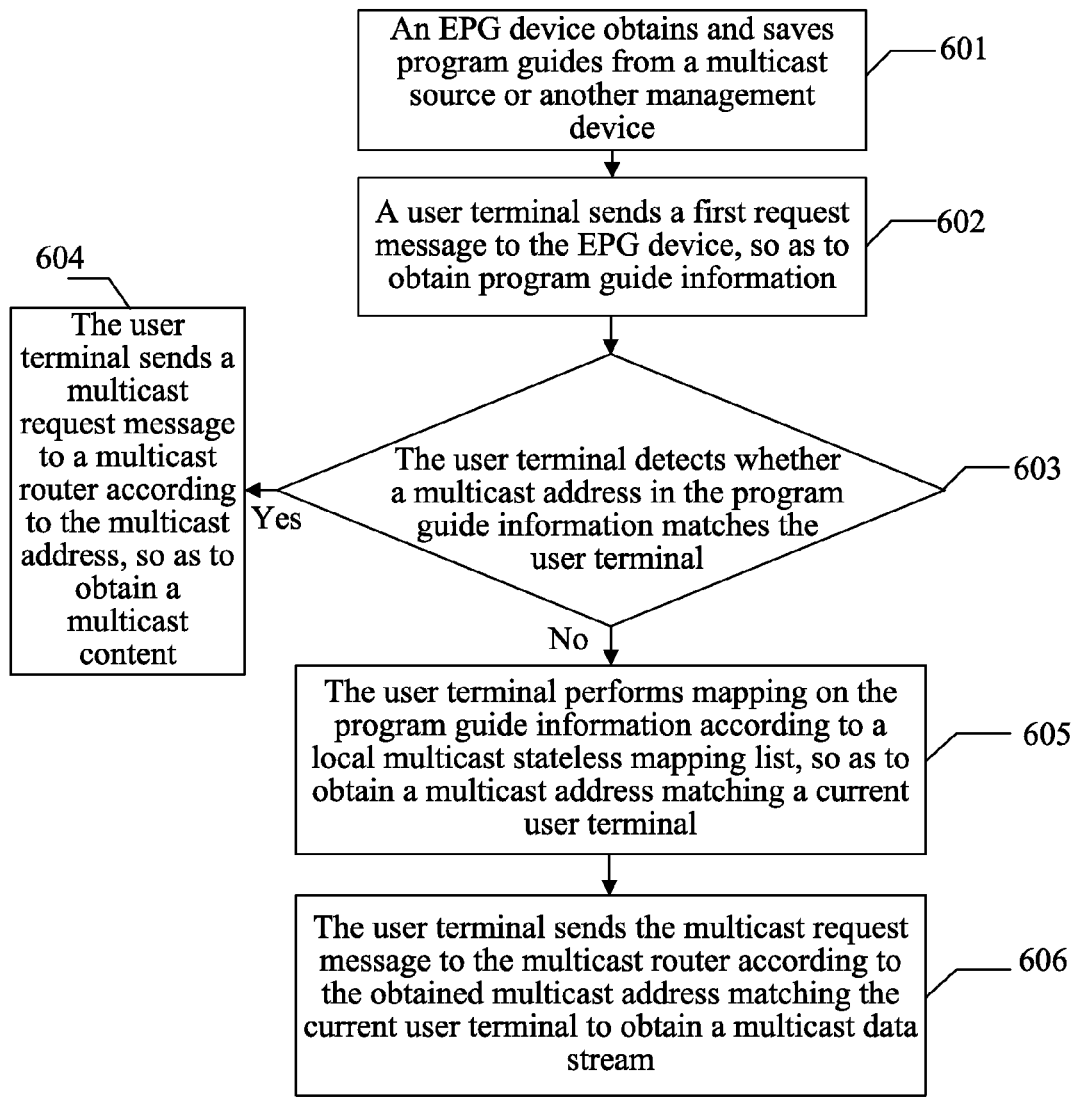
FIG. 6 is a schematic flow chart of a method according to another embodiment of the present application.

Another embodiment of the present application provides a method for obtaining a multicast address and is shown in FIG. 6. The method includes the following steps.

601: An EPG device obtains and saves program guides from a multicast source or another management device (a device which can release program guide information). The program guides include a correspondence between a multicast channel and an IPv4 multicast address, or a correspondence between a multicast channel and an IPv6 multicast address.

602: A user terminal sends a first request message to the EPG device, so as to obtain the program guide information. The first request message is used to instruct the EPG device to deliver the program guide information to the user terminal.

603: The user terminal detects whether a multicast address in the program guide information matches the user terminal. If yes, step 604 is executed, and if not, step 605 is executed. The matching refers to that an IP version supported by the multicast address is consistent with an IP version supported by the user terminal.

Specifically, when the user terminal supports IPv4, a multicast address matching the user terminal is the IPv4 multicast address. When the user terminal supports IPv6, the multicast address matching the user terminal is the IPv6 multicast address.

604: The user terminal sends a multicast request message to a multicast router according to the multicast address, so as to obtain a multicast data stream.

The multicast router is configured to process a received multicast control packet, and obtain the multicast data stream from the multicast source for sending.

605: The user terminal performs mapping on the program guide information according to a local multicast stateless mapping relationship list, so as to obtain a multicast address matching a current user terminal. The multicast stateless mapping relationship list is used to determine a mapping relationship between the IPv4 multicast address and the IPv6 multicast address.

606: The user terminal sends the multicast request message to the multicast router according to the obtained multicast address matching the current user terminal to obtain the multicast data stream.

Specifically, when the user terminal only supports an IPv4 protocol, the multicast request message sent to the multicast source is an IGMP request message. When the user terminal only supports an IPv6 protocol, the multicast request message sent to the multicast source is an MLD request message. When the user terminal supports both the IPv4 protocol and the IPv6 protocol, the multicast request message sent to the multicast source is an IGMP request message or an MLD request message.

In the method for obtaining the multicast address provided in the embodiment of the present application, when the multicast address in the program guide information obtained by the user terminal does not match the IP version supported by the user terminal, the user terminal may perform mapping on the program guide information according to the local multicast stateless mapping relationship list, so as to obtain the multicast address matching the user terminal. In the method provided in the embodiment of the present application, during a process that the user terminal obtains the multicast address matching the user terminal, interaction between the EPG device and an ALG is not required, which, compared with the prior art, lowers complexity of a device in an IPTV management system, and is beneficial for migrating an IPTV service management system from IPv4 to IPv6.

Figure 7:
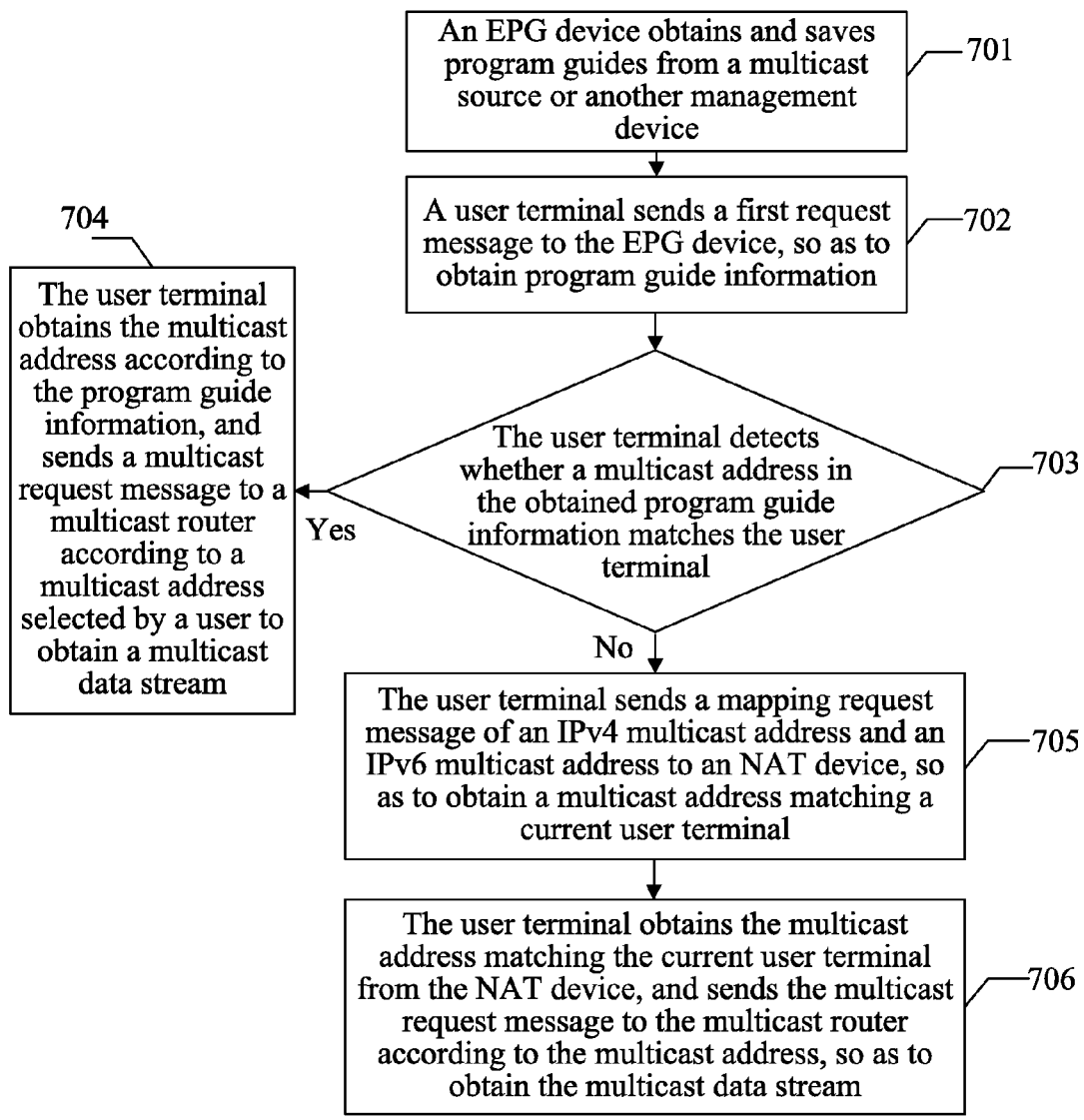
FIG. 7 is a schematic flow chart of a method according to another embodiment of the present application.

Another embodiment of the present application provides a method for obtaining a multicast address. As shown in FIG. 7, the method includes the following steps.

701: An EPG device obtains and saves program guides from a multicast source or another management device (a device which can release program guide information), where the program guides include a correspondence between a multicast channel and an IPv4 multicast address, or a correspondence between a multicast channel and an IPv6 multicast address.

702: A user terminal sends a first request message to the EPG device, so as to obtain the program guide information, where the first request message is used to instruct the EPG device to deliver the program guide information to the user terminal.

703: The user terminal obtains the program guide information from the EPG device, and detects whether a multicast address in the program guide information matches the user terminal. If yes, step 704 is executed and if not step 705 is executed.

704: The user terminal obtains the multicast address according to the program guide information, and sends a multicast request message to a multicast router according to a multicast address selected by a user to obtain a multicast data stream. The multicast router is configured to process a received multicast control packet, and obtain the multicast data stream from the multicast source for allocation.

705: The user terminal sends a mapping request message of the IPv4 multicast address and the IPv6 multicast address to an NAT (network address translation) device, so as to obtain a multicast address matching a current user terminal.

According to a function (such as an interworking capability of an IPv4 network and IPv6 network, and an application layer function) of an ALG of NAT device in the prior art, a mapping table of the IPv4 multicast address and the IPv6 multicast address may be generated according to a mapping rule of the NAT device.

706: The user terminal obtains the multicast address matching the current user terminal from the NAT device, and sends the multicast request message to the multicast router according to the multicast address, so as to obtain the multicast data stream.

Specifically, when the user terminal only supports an IPv4 protocol, the multicast request message sent to the multicast router is an IGMP request message; when the user terminal only supports an IPv6 protocol, the multicast request message sent to the multicast router is an MLD request message; when the user terminal supports both the IPv4 protocol and the IPv6 protocol, the multicast request message sent to the multicast router is an IGMP request message or an MLD request message.

In the method for obtaining the multicast address provided in the embodiment of the present application, when the program guides obtained by the user terminal from the EPG device does not match the IP version supported by the user terminal, the user terminal may send a mapping request to an ALG, so as to obtain the multicast address matching the user terminal. In the method provided in the embodiment of the present application, during a process that the user terminal obtains the multicast address matching the user terminal, interaction between the EPG device and the ALG is not required, which, compared with the prior art, may lower complexity of a device in an IPTV system, and is beneficial for migrating an IPTV service management system from IPv4 to IPv6.

Figure 8:
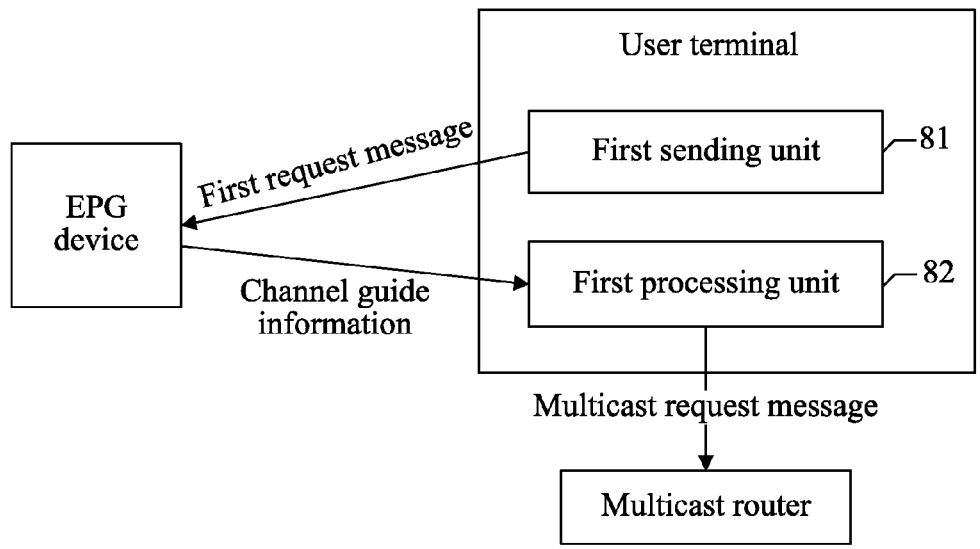
FIG. 8 to FIG. 11 are schematic structural diagrams of a user terminal according to an embodiment of the present application.

An embodiment of the present application provides a user terminal, which may implement the methods of a user terminal side in the foregoing method embodiments. As shown in FIG. 8. The user terminal includes a number of units.

A first sending unit 81 is configured to send a first request message to an EPG device to obtain program guide information. A first processing unit 82 is configured to receive the program guide information returned by the EPG device, to obtain, a multicast address matching the current user terminal according to the program guide information, and to send a multicast request message according to the multicast address. The multicast request message includes a multicast address selected by a user.

Specifically, the program guide information received by the first processing unit 82 includes at least one of a correspondence between a multicast channel and an Internet protocol version 4 IPv4 multicast address, or a correspondence between the multicast channel and an Internet protocol version 6 IPv6 multicast address. The multicast address includes a multicast group address or the multicast address includes a multicast group address and a multicast source address. The multicast request message sent by the first processing unit 82 to a multicast router may be an IGMP request message or an MLD request message.

Specifically, when the user terminal only supports an IPv4 protocol, the multicast request message sent to the multicast router is an IGMP request message. When the user terminal only supports an IPv6 protocol, the multicast request message sent to the multicast router is an MLD request message. When the user terminal supports both the IPv4 protocol and the IPv6 protocol, the multicast request message sent to the multicast router is an IGMP request message or an MLD request message.

In one aspect, the first processing unit 82 is specifically further configured to carry, in the first request message, a terminal identifier of the current user terminal, so as to instruct the EPG device to deliver program guide information to the current user terminal. The program guide information includes the multicast address matching the current user terminal and the terminal identifier is used to represent an IP version supported by the current user terminal.

In another aspect, the program guide information received by the first processing unit 82 specifically includes the correspondence between the multicast channel and the IPv4 multicast address, and the correspondence between the multicast channel and the IPv6 multicast address.

Figure 9:
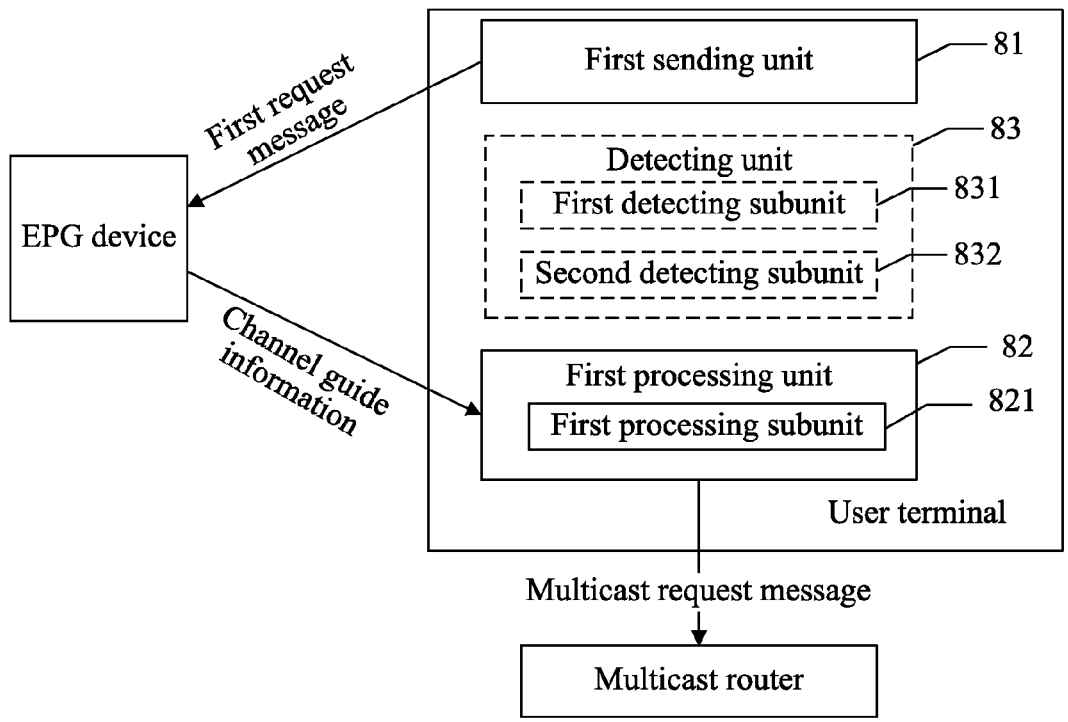

As shown in FIG. 9, the first processing unit 82 further includes a first processing subunit 821, which is configured to choose the program guide information according to the IP version supported by the current user terminal, and determine a multicast address matching the IP version supported by the current user terminal. The matching refers to that an IP version supported by the multicast address is consistent with the IP version supported by the user terminal.

Preferably, when the user terminal supports both the IPv4 protocol and the IPv6 protocol, as shown in a dotted line part in FIG. 9, the user terminal further includes a detecting unit 83, which is configured to detect an IP version supported by a current network.

The first processing unit 82 is specifically configured to send the IGMP request message to the multicast router to obtain the multicast data stream when the detecting unit 83 determines that the network supports IPv4. When the detecting unit 83 determines that the network supports IPv6, the first processing unit 82 sends the MLD request message to the multicast router to obtain the multicast data stream. When the detecting unit 83 determines that the network supports both IPv4 and IPv6, the first processing unit 82 sends the IGMP request message or the MLD request message to the multicast router to obtain the multicast data stream.

Further, as shown in the dotted line part in FIG. 9, the detecting unit 83 includes a first detecting subunit 831 or a second detecting subunit 832. The first detecting subunit 831 is configured to determine, according to WAN interface information of a home gateway obtained by the user terminal, the IP version supported by the current network. A second detecting subunit 832 is configured to receive an indication message sent by a DHCP server, so as to determine the IP version supported by the network.

Figure 10:
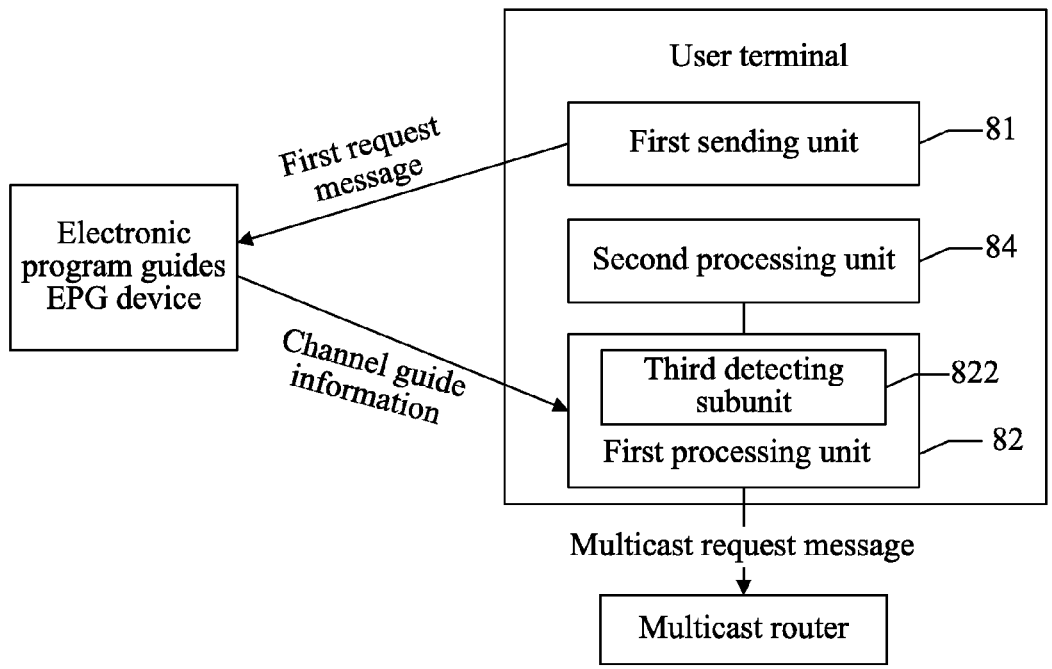

In still another aspect, according to the user terminal shown in FIG. 8, when the program guide information obtained by the first processing unit 82 includes the correspondence between the multicast channel and the IPv4 multicast address, or the correspondence between the multicast channel and the IPv6 multicast address, further, as shown in FIG. 10, the first processing unit 82 further includes a third detecting subunit 822, and the user terminal further includes a second processing unit 84, where:

The third detecting subunit 822 is configured to detect whether the multicast address in the program guide information matches the current user terminal. The first processing unit 82 is configured to, when the third detecting subunit 822 determines that the multicast address in the program guide information matches the current user terminal, send the multicast request message to the multicast router according to the program guide information to obtain the multicast data stream. The second processing unit 84 is configured to, when the third detecting subunit 822 determines that the program guide information does not match the current user terminal, perform mapping on the program guide information according to a multicast stateless mapping relationship list, so as to obtain the multicast address matching the current user terminal.

Figure 11:
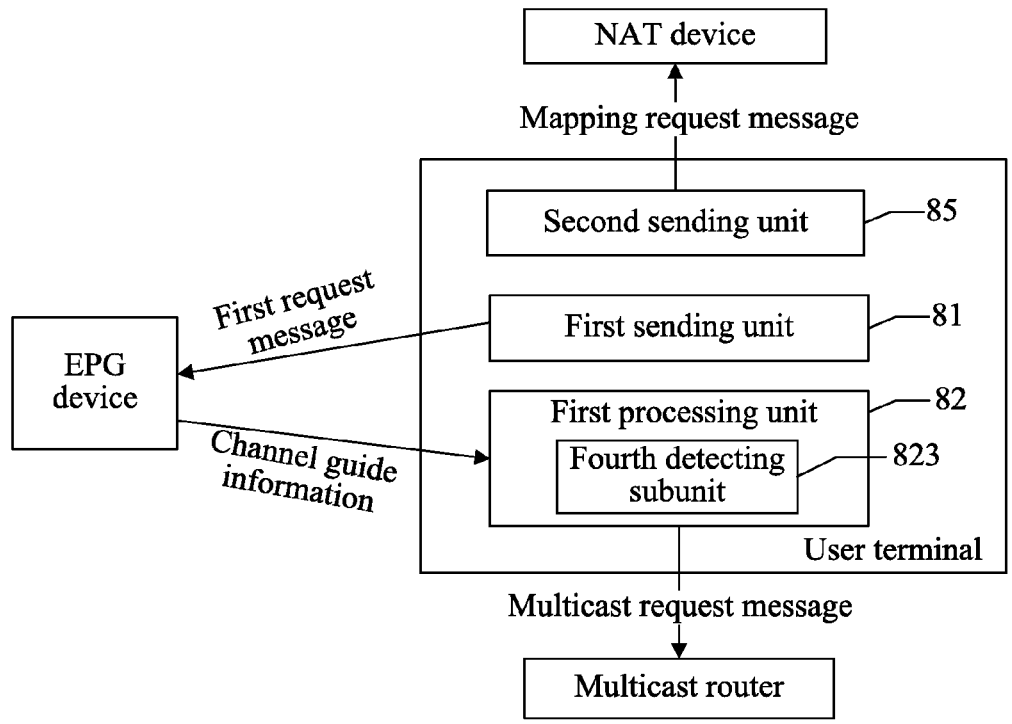

In yet another aspect, according to the user terminal shown in FIG. 8, when the program guide information received by the first processing unit 82 includes the correspondence between the multicast channel and the IPv4 multicast address, or the correspondence between the multicast channel and the IPv6 multicast address, further, as shown in FIG. 11, the first processing unit 82 includes a fourth detecting subunit 823, and the user terminal further includes a second sending unit 85.

The fourth detecting subunit 823 is configured to detect whether the multicast address in the program guide information matches the current user terminal. Specifically, the first processing unit 82 is configured to, when the fourth detecting subunit 823 determines that the program guide information matches the current user terminal, send the multicast request message to the multicast router according to the multicast address to obtain the multicast data stream. The second sending unit 85 is configured to, when the fourth detecting subunit 823 determines that the program guide information does not match the current user terminal, send a mapping request message of the IPv4 multicast address and the IPv6 multicast address to an NAT device, so as to obtain the multicast address matching the current user terminal, where the NAT device has an interworking capability of an IPv4 network and an IPv6 network and an application layer function and is capable of generating a mapping table of the IPv4 multicast address and the IPv6 multicast address according to a mapping rule of the NAT device and sending the mapping table to the user terminal, so that the user terminal obtains the multicast address matching the user terminal.

It should be noted that, the user terminal provided in the embodiment of the present application may be an STB in an IPTV system or a computer in an IPTV system, or another device having a similar function, which is not limited herein.

The user terminal provided in the embodiment of the present application may automatically obtain the program guide information matching the user terminal to determine the multicast address, and further send a multicast request to the multicast source to obtain the multicast data stream. Compared with the prior art, when obtaining the program guide information, the user terminal provided in the embodiment of the present application can lower complexity of a network device in an IPTV system, and is beneficial for migrating an IPTV service management system from IPv4 to IPv6.

Figure 12:
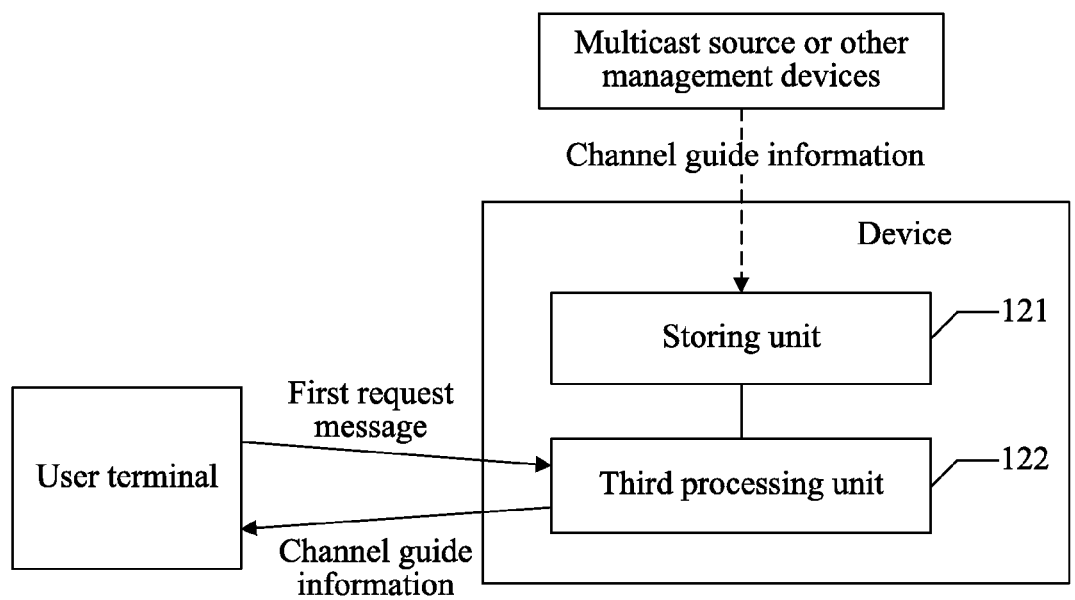
FIG. 12 is a schematic structural diagram of an EPG device according to another embodiment of the present application.

Another embodiment of the present application provides a device, which may implement the methods of an EPG device side in the foregoing method embodiments. An example of the device is shown in FIG. 12. A storing unit 121 is configured to obtain and save program guide information, where the program guide information includes a correspondence between a multicast channel and a multicast address. A third processing unit 122, configured to, when a first request message sent by a user terminal is received, send the program guide information to the user terminal, so as to enable the user terminal to obtain, according to the program guide information, a multicast address matching the user terminal. The first request message is used to instruct the device to deliver the program guide information to the user terminal. The matching refers to that an IP version supported by the multicast address is consistent with an IP version supported by the user terminal.

Further, as shown in a dotted line part in FIG. 12, the storing unit 121 is specifically configured to obtain and save two copies of program guide information. The two copies of program guide information respectively include a correspondence between the multicast channel and an IPv4 multicast address and a correspondence between the multicast channel and an IPv6 multicast address. The first request message received by the third processing unit 122 includes a terminal identifier of the user terminal. The terminal identifier is used to represent the IP version supported by the user terminal. The third processing unit 122 is specifically configured to determine, according to the terminal identifier, program guide information matching the user terminal, and send the program guide information matching the user terminal to the user terminal. The program guide information includes the multicast address matching the user terminal.

According to the device shown in FIG. 12, the storing unit 121 is specifically configured to obtain the program guide information, and to save the correspondence between the multicast channel and the IPv4 multicast address, and the correspondence between the multicast channel and the IPv6 multicast address. The third processing unit 122 is specifically configured to send the correspondence between the multicast channel and the IPv4 multicast address and the correspondence between the multicast channel and the IPv6 multicast address to the user terminal, so that the user terminal selects the multicast address matching the user terminal.

The device provided in the embodiment of the present application may send program guide information to the user terminal, so as to enable the user terminal to obtain the multicast address, and obtain a multicast data stream according to the multicast address. Compared with the prior art, when delivering the program guide information to the user terminal, the device provided in the embodiment of the present application does not need to interact with other network devices in an IPTV system, which simplifies a process for obtaining the multicast address, and is beneficial for migrating an IPTV service management system from IPv4 to IPv6.

The embodiment of the present application further provides a system for obtaining a multicast address, which may implement the foregoing method embodiments. The system includes a multicast source, the user terminal shown in FIG. 8 to FIG. 11 and the device as shown in FIG. 12, where the multicast source is configured to provide the device with a correspondence between a multicast channel and a multicast address. Compared with the prior art, the device in the system for obtaining the multicast address provided in the embodiment of the present application has a lower complexity, and may determine a multicast message according to a topology of a network to optimize transmission of a multicast data stream, which is beneficial for migrating an IPTV service management system from IPv4 to IPv6.

Through the foregoing description of the implementation manners, a person skilled in the art may clearly understand that the present application may be implemented in a manner of software plus a necessary universal hardware platform, and certainly, may also be implemented by hardware. However, in most cases, the former is a preferred implementation manner. Based on such understanding, the technical solutions of the present application or the part that makes contributions to the prior art can be substantially embodied in a form of a software product. The computer software product is stored in a readable storage medium, such as a floppy disk, a hard disk or an optical disc, and includes several instructions to instruct a computer device (which may be a personal computer, a server, a multicast source, or the like) to perform the method according to each embodiment of the present application.

The foregoing description is merely specific implementation manners of the present application, but is not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for obtaining a multicast address, the method comprising:

sending a first request message to an electronic program guide (EPG) device to obtain program guide information, wherein the first request message carries a terminal identifier of a current user terminal, wherein the program guide information comprises a multicast address matching the current user terminal, and the terminal identifier is used to represent an IP version supported by the current user terminal, and wherein the multicast address that matches the current user terminal comprises an IP version supported by the multicast address that is consistent with the IP version supported by the current user terminal;

receiving the program guide information returned by the EPG device, wherein the program guide information further comprises at least one of: a correspondence between a multicast channel and an Internet protocol version 4 (IPv4) multicast address, and a correspondence between the multicast channel and an Internet protocol version 6 (IPv6) multicast address;

obtaining, according to the program guide information, a multicast address matching the current user terminal; and sending a multicast request message according to the multicast address matching the current user terminal, wherein the multicast request message comprises a multicast address selected by a user, wherein the multicast address selected by the user comprises a multicast group address, and wherein the multicast request message comprises at least one of: an Internet group management protocol (IGMP) request message and a multicast listener discover (MLD) request message.

2. A method for obtaining a multicast address, the method comprising:

sending a first request message to an electronic program guide (EPG) device to obtain program guide information, wherein the program guide information comprises at least one of: a correspondence between a multicast channel, and an Internet protocol version 4 (IPv4) multicast address, and a correspondence between a multicast channel and an Internet protocol version 6 (IPv6) multicast address;

receiving the program guide information returned by the EPG device;

obtaining, according to the program guide information, a multicast address matching a current user terminal, wherein obtaining the multicast address matching the current user terminal comprises choosing the program guide information according to an IP version supported by the current user terminal and determining a multicast address matching the IP version supported by the current user terminal; and sending a multicast request message according to the multicast address matching the current user terminal, wherein the multicast request message comprises a multicast address selected by a user.

3. The method according to claim 2, wherein the current user terminal supports both an IPv4 protocol and an IPv6 protocol and wherein, before the sending a multicast request message, the method further comprises detecting an IP version supported by a current network; and wherein the sending a multicast request message comprises one of:
when the network supports IPv4, sending an Internet group management protocol (IGMP) request message;
when the network supports IPv6, sending a multicast listener discover (MLD) request message; and
when the network supports both IPv4 and IPv6, sending at least one of the IGMP request message and the MLD request message.

4. The method according to claim 3, wherein detecting an IP version supported by a current network comprises one of:
determining, according to wide area network (WAN) interface information obtained by the user terminal, the IP version supported by the current network; and
receiving an indication message sent by a dynamic host configuration protocol (DHCP) server.

5. The method of claim 2, wherein the multicast address comprises a multicast group address; the matching refers to an IP version supported by the multicast address that is consistent with the IP version supported by the user terminal; and the multicast request message comprises at least one of an Internet group management protocol (IGMP) request message and a multicast listener discover (MLD) request message.

6. A method for obtaining a multicast address, the method comprising:
sending a first request message to an electronic program guide (EPG) device to obtain program guide information;
receiving the program guide information returned by the EPG device, wherein the program guide information comprises at least one of a correspondence between a multicast channel and an Internet protocol version 4 (IPv4) multicast address and a correspondence between a multicast channel and an Internet protocol version 6 (IPv6) multicast address;
after receiving the program guide information returned by the EPG device, obtaining, according to the program guide information, one or more multicast addresses matching a current user terminal, wherein obtaining the one or more multicast addresses matching the current user terminal comprises:
when the multicast address in the program guide information matches the current user terminal, obtaining the multicast address matching the current user terminal from the program guide information; and
when the multicast address in the program guide information does not match the current user terminal, performing mapping on the program guide information according to at least one of a multicast stateless mapping rule and a multicast mapping table of IPv4 and IPv6 to obtain the multicast address matching the current user terminal; and sending a multicast request message according to the one or more multicast addresses, wherein the multicast request message comprises a multicast address selected by a user.

7. The method of claim 6, wherein the multicast address comprises a multicast group address; the matching refers to an IP version supported by the multicast address that is consistent with the IP version supported by the user terminal; and the multicast request message comprises at least one of an Internet group management protocol (IGMP) request message and a multicast listener discover (MLD) request message.

8. A method for obtaining a multicast address, the method comprising:
sending a first request message to an electronic program guide (EPG) device to obtain program guide information, wherein the program guide information comprises at least one of: a correspondence between a multicast channel and an Internet protocol version 4 (IPv4) multicast address, and a correspondence between a multicast channel and an Internet protocol version 6 (IPv6) multicast address;
receiving the program guide information returned by the EPG device;
after receiving the program guide information returned by the EPG device, obtaining, according to the program guide information, one or more multicast addresses matching a current user terminal, wherein obtaining the one or more multicast addresses matching the current user terminal comprises:
when the multicast address in the program guide information matches the current user terminal, obtaining the multicast address matching the current user terminal from the program guide information; and
when the multicast address in the program guide information does not match the current user terminal, sending a mapping request message of the IPv4 multicast address and the IPv6 multicast address to a network multicast address translation (NAT) device, to obtain the multicast address matching the current user terminal; and
sending a multicast request message according to the multicast addresses, wherein the multicast request message comprises a multicast address selected by a user.

9. The method according to claim 8, wherein the NAT device has an interworking capability of an IPv4 network and an IPv6 network and is capable of generating a mapping table of the IPv4 multicast address and the IPv6 multicast address according to a mapping rule of the NAT device and sending the mapping table to the user terminal.

10. The method of claim 8, wherein the multicast address comprises a multicast group address; the matching refers to an IP version supported by the multicast address that is consistent with the IP version supported by the user terminal; and the multicast request message comprises at least one of an Internet group management protocol (IGMP) request message and a multicast listener discover (MLD) request message.

11. A method for obtaining a multicast address, the method comprising:
obtaining and saving program guide information, by an electronic program guide (EPG) device, wherein the program guide information comprises a correspondence between a multicast channel and a multicast address, and wherein obtaining and saving the program guide information comprises:

obtaining and saving two copies of the program guide information, wherein each of the two copies of the program guide information comprises at least one of: a correspondence between a multicast channel and an Internet protocol version 4 (IPv4) multicast address, and a correspondence between the multicast channel and an Internet protocol version 6 (IPv6) multicast address;

receiving a first request message sent by a user terminal, wherein the first request message comprises a terminal identifier of the user terminal, wherein the terminal identifier is used to represent an IP version supported by the user terminal; and sending, by the EPG device, the program guide information to the user terminal in response to the first request message, wherein the first request message is used to instruct an electronic program guides (EPG) device to deliver the program guide information to the user terminal, wherein sending the program guide information to the user terminal comprises:

determining, according to the terminal identifier, program guide information matching the user terminal, wherein the program guide information comprises the multicast address matching the user terminal, the matching referring to an internet protocol (IP) version is supported by the multicast address being consistent with the IP version supported by the user terminal; and sending the program guide information matching the user terminal to the user terminal.

12. A method for obtaining a multicast address, the method comprising:

obtaining and saving program guide information, by an electronic program guide (EPG) device, wherein the program guide information comprises a correspondence between a multicast channel and a multicast address, wherein obtaining and saving program guide information comprises:

obtaining the program guide information and saving the a correspondence between a multicast channel and an Internet protocol version 4 (IPv4) multicast address and a correspondence between a multicast channel and an Internet protocol version 6 (IPv6) multicast address;

receiving a first request message sent by a user terminal; and sending, by the EPG device, the program guide information to the user terminal in response to the first request message, wherein the first request message is used to instruct an electronic program guides (EPG) device to deliver the program guide information to the user terminal, wherein sending the program guide information to the user terminal comprises sending the correspondence between the multicast channel and the IPv4 multicast address and the correspondence between the multicast channel and the IPv6 multicast address to the user terminal.

13. A user terminal, comprising:

a first transmitter, configured to send a first request message to an electronic program guides (EPG) device to obtain program guide information; and a first processor, configured to:

receive the program guide information returned by the EPG device, obtain, according to the program guide information, one or more multicast address(es) matching the user terminal, and send a multicast request message according to the multicast address(es) matching the user terminal, wherein the multicast request message comprises a multicast address selected by a user;

wherein the program guide information received by the first processor comprises at least one of: a correspondence between a multicast channel and an Internet protocol version 4 (IPv4) multicast address, and a correspondence between a multicast channel and an Internet protocol version 6 (IPv6) multicast address, and the multicast address comprises a multicast group address; and wherein the multicast request message sent by the first processor comprises an Internet group management protocol (IGMP) request message or a multicast listener discover (MLD) request message.

14. The user terminal according to claim 13, wherein the first processor is further configured to carry, in the first request message, a terminal identifier of the user terminal, wherein the program guide information comprises the multicast address(es) matching the current user terminal, and the terminal identifier is used to represent an IP version supported by the current user terminal.

15. The user terminal according to claim 13, wherein the program guide information received by the first processor comprises the correspondence between the multicast channel and the IPv4 multicast address, and the correspondence between the multicast channel and the IPv6 multicast address; and wherein the first processor is further configured to choose the program guide information according to the IP version supported by the current user terminal, and to determine a multicast address matching the IP version supported by the current user terminal, wherein the matching refers to that an IP version supported by the multicast address is consistent with the IP version supported by the user terminal.

16. The user terminal according to claim 15, wherein the user terminal supports both an IPv4 protocol and an IPv6 protocol, the user terminal further comprising:

a detector, configured to detect an IP version supported by a current network; and the first processor is specifically configured to:

when the network supports IPv4, send the IGMP request message;

when the network supports IPv6, send the MLD request message; and when the network supports both IPv4 and IPv6, send at least one of: the IGMP request message and the MLD request message.

17. The user terminal according to claim 16, wherein the detector comprises at least one of:

a first sub-detector, configured to determine, according to wide area network (WAN) interface information obtained by the user terminal, the IP version supported by the current network; and a second sub-detector, configured to receive an indication message sent by a dynamic host configuration protocol (DHCP) server.

18. The user terminal according to claim 13, wherein the program guide information obtained by the first processor comprises at least one of the correspondence between the multicast channel and the IPv4 multicast address and the correspondence between the multicast channel and the IPv6 multicast address;

wherein the first processor further comprises a third sub-detector, configured to detect whether the multicast address in the program guide information matches the current user terminal;

wherein the first processor is configured to, when the third sub-detector detecting subunit determines that the multicast address in the program guide information matches the current user terminal, send the multicast request message according to the multicast address; and wherein the user terminal further comprises a second processor, configured to, when the third sub-detector determines that the program guide information does not match the current user terminal, perform mapping on the program guide information according to a multicast stateless mapping relationship list to obtain the multicast address matching the current user terminal.

19. The user terminal according to claim 13, wherein the program guide information received by the first processor comprises at least one of: the correspondence between the multicast channel and the IPv4 multicast address, and the correspondence between the multicast channel and the IPv6 multicast address;

wherein the first processor further comprises a fourth sub-detector, configured to detect whether the multicast address in the program guide information matches the current user terminal;

wherein the first processor is configured to, when the fourth sub-detector determines that the program guide information matches the current user terminal, send the multicast request message according to the multicast address; and wherein the user terminal further comprises a second transmitter, configured to, when the fourth sub-detector determines that the program guide information does not match the current user terminal, send a mapping request message of the IPv4 multicast address and the IPv6 multicast address to a network multicast address translation (NAT) device, to obtain the multicast address matching the current user terminal, wherein the NAT device has an interworking capability of an IPv4 network and an IPv6 network and is capable of generating a mapping table of the IPv4 multicast address and the IPv6 multicast address according to a mapping rule of the NAT device and sending the mapping table to the user terminal.

* * * * *

UNITED STATES PATENT AND TRADEMARK OFFICE
CERTIFICATE OF CORRECTION

PATENT NO. : 9,516,385 B2
APPLICATION NO. : 14/298486
DATED : December 6, 2016
INVENTOR(S) : Zhongjian Zhang It is certified that error appears in the above-identified patent and that said Letters Patent is hereby corrected as shown below:

In the Claims

In Column 19, Line 6, Claim 18, delete "detecting subunit".

Signed and Sealed this
Tenth Day of April, 2018

Andrei Iancu
*Director of the United States Patent and Trademark Office*